July 24, 1928.

L. JOHNSON

REEL

Filed Dec. 7, 1923

INVENTOR

Patented July 24, 1928.

1,678,472

UNITED STATES PATENT OFFICE.

LANE JOHNSON, OF PITTSBURGH, PENNSYLVANIA, ASSIGNOR TO UNITED ENGINEERING AND FOUNDRY COMPANY, OF PITTSBURGH, PENNSYLVANIA, A CORPORATION OF PENNSYLVANIA.

REEL.

Application filed December 7, 1923. Serial No. 679,134.

The present invention relates to reels, and more particularly to reels for coiling strip, wire or similar material.

When coiling material which is being positively delivered to the reeling mechanism, or which is supported on a carrier or reel, the leading end of the material is secured to the winding drum and the latter is started up. It is desirable to initially rotate the drum at a relatively high speed, in order to quickly take up the slack, and thereafter coil at a lower speed. The object of the present invention is to provide a reel embodying automatic means for reducing the speed of rotation of the drum at the instant that the slack is taken up, in order that the material being coiled may not be subjected to a sudden tension tending to snap the same.

In the accompanying drawings, there is shown, for purposes of illustration only, one embodiment of the present invention, it being understood that the drawings do not define the limits of the invention, as changes may be made in the construction and operation therein disclosed without departing from the spirit of the invention or scope of my broader claims.

Figure 1:
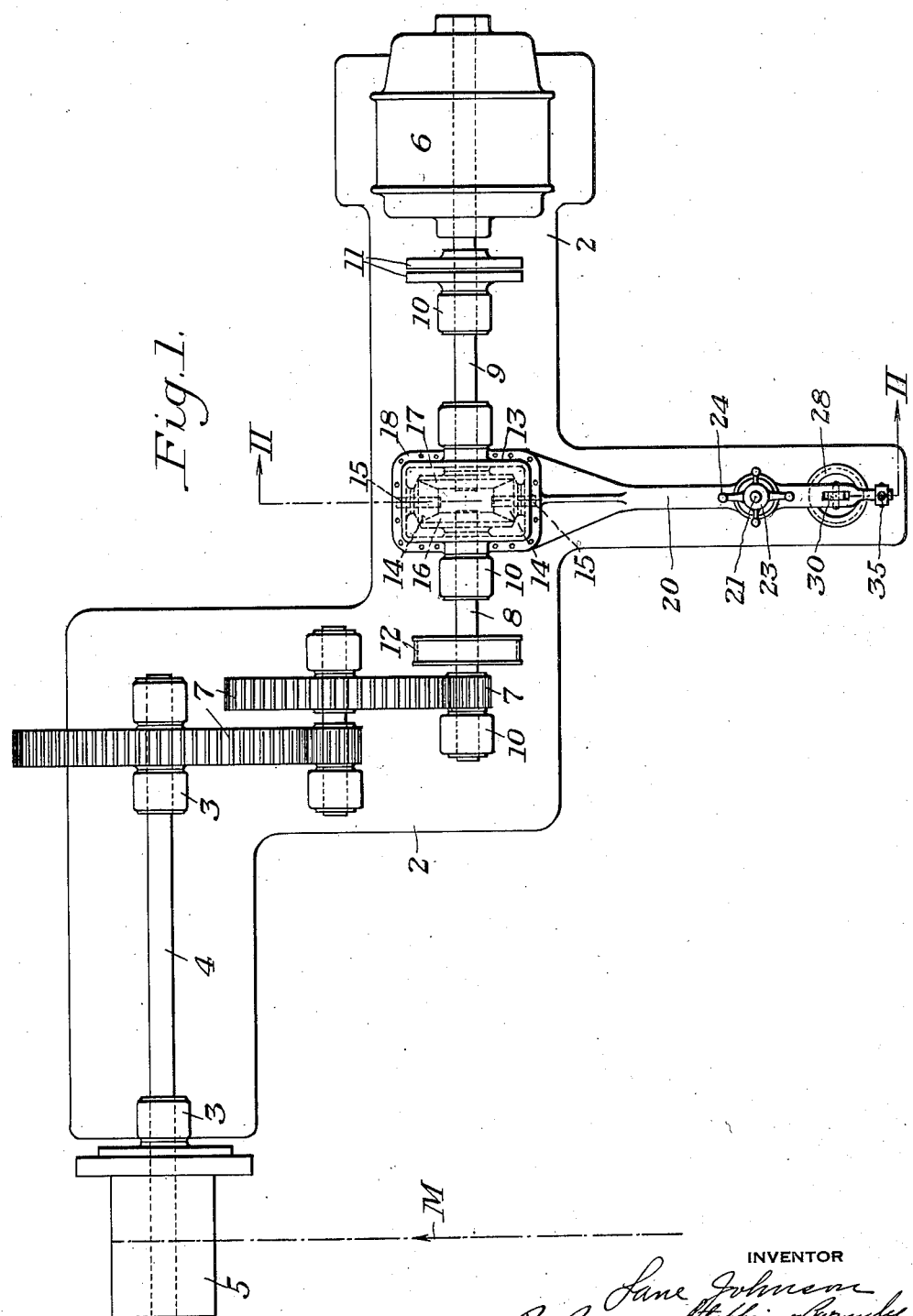
Figure 1 is a top plan view of a reel embodying my invention.

In the illustrative embodiment of the invention, the reference numeral 2 designates a suitable base upon which the reeling mechanism is supported. Supported in bearings 3 is a shaft 4 upon one end of which is mounted a coiling drum 5. A motor 6 is supported on the base and drives the shaft 4 through a train of gears 7 and differential means which will now be described.

The differential means comprises a pair of aligned shafts 8 and 9, each supported in bearings 10 rising from the base 2. The shaft 9 is adapted to be operatively connected to the motor 6 through a suitable clutch 11, and the shaft 8 may have a brake 12 associated therewith. The adjacent ends of the shafts 8 and 9 project into a housing 13, the said housing being pivotally supported upon said projecting ends. Within the housing is a pair of bevel pinions 14 which are journaled upon stub-shafts 15 extending at right angles to the shafts 8 and 9, these bevel pinions meshing with bevel gears 16 and 17 on the ends of the shafts 8 and 9. The housing is oil-tight and comprises a cover 18 having a covered opening 19 therein, through which suitable oil or grease may be introduced. The housing has an arm 20 extending at right angles to the shafts 8 and 9, and a guide rod 21 extends through the arm near the free end thereof. This guide rod is pivoted at its lower end to an upwardly extending lug 22 rising from the base 2, and has its upper end screw threaded to receive a nut 23 provided with a handle 24 for adjusting the same. A coil spring 25 surrounds the lower portion of the rod and is interposed between the lower side of the arm 20 and a collar 26 on the lower end of the rod. Another coil spring 27 surrounds the upper portion of the rod and is interposed between the upper side of the arm 20 and the nut 23. These springs normally maintain the arm 20 in a horizontal position. The upper spring constitutes resilient means tending to restrict the swinging of the arm 20 in a counter-clockwise direction.

In order to cushion and partially check the return movement of the arm 20, there may be provided a dash-pot cylinder 28 supported on the base 2 and having a piston 29 working therein. A piston rod 30 is pivotally connected at its lower end to the piston, and has its upper end connected to the arm 20. The dash-pot may have an air connection 31 provided with a controllable air opening 32 adapted to be regulated by a valve 33 and with a check valve 34 tending to restrict downward movement of the piston in the cylinder, but permitting relatively unrestricted upward movement thereof.

Advantage is taken of the swinging movements of the arm 20 to control the speed of the motor, and to that end the arm is connected by a link 35 to the arm 36 of a rheostat 37 in the motor circuit.

Figure 2:
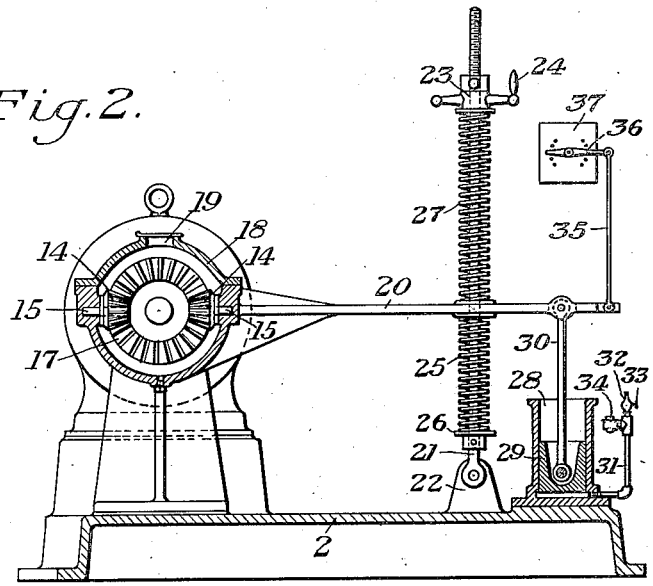
Figure 2 is a transverse sectional view on the line II—II of Figure 1.
Figure 3:
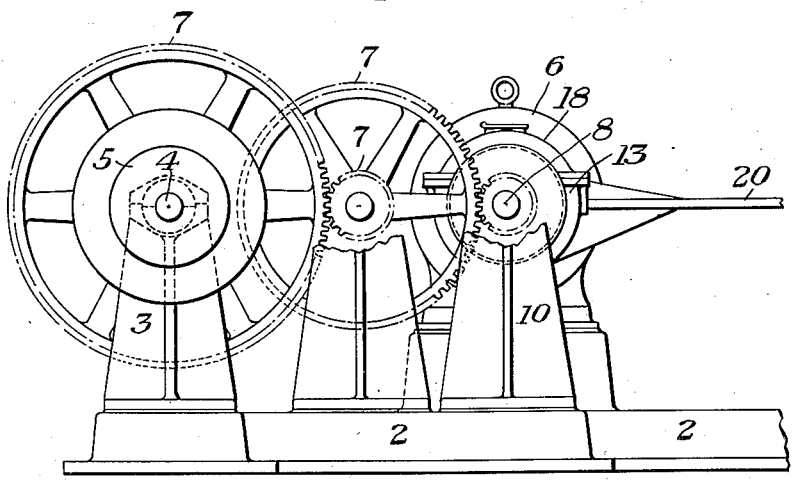
Figure 3 is an end view of the reel shown in Figure 1.

In operation, the coiling drum 5 is rotated in a counter-clockwise direction, as viewed in Figure 3, and the material M, represented by a chain line in Figure 1, moves in the direction of the arrow. During the initial rotation of the drum for the purpose of taking up slack, the arm 20 will occupy substantially the position shown in Figure 2. At the moment the slack in the material being coiled is taken up, the latter tends to slow down the speed of rotation of the drum. The motor 6, however, tends to maintain the initial speed of the drum, and this would tend to place an objectionable strain upon the material being coiled but for the differential means in the driving connection between the motor and the drum. At the instant that the slack in the material is taken up, the speed of rotation of the bevel gear 16 becomes momentarily less than that of the bevel gear 17 owing to the pull of the material, so that the latter gear causes the bevel pinions 14 to roll on the bevel gear 16 and the differential housing 13 and arm 20 to swing in a counter-clockwise direction. As the arm 20 is moved in this manner, the rheostat arm 36 is moved in a direction to decrease the speed of the motor. In this manner, the motor speed is decreased as soon as the slack in the material is taken up, thereby avoiding any possibility of snapping the material because of a suddenly applied increased tension being placed thereon.

The advantages of the invention arise from the provision of a reeling mechanism embodying differential means for relieving strain on the material being coiled at the instant that the slack therein is taken up, and for automatically changing the speed of rotation of the drum at such time.

I claim:

1. The combination with a driving motor, of an element driven thereby, a differential gear mechanism through which the motor and driven element are connected, and a motor control associated with the differential, said control being arranged to slow down the driving motor when the driven element is slowed down.

2. The combination with a driving and a driven element operatively connected through a differential gear mechanism, said mechanism including a differential gear frame, of an arm on said frame, a motor speed controller operatively associated with the arm, and resilient means for resisting the movement of the arm out of a normal position in either direction.

3. The combination with a driving motor, of a drum driven thereby, a differential operatively interposed between the driving element and the drum, and a motor controlling element operatively connected with the differential whereby the motor speed may be varied in accordance with variations in the load on the drum.

4. The combination with a reel, of a driving motor for the reel, a differential driving gear between the motor and the reel for relieving the strain on the material being reeled when the same becomes taut, and a motor control operatively connected with the differential gear and adapted to slow down the motor when movement of the differential is caused by the material becoming taut and to speed up the motor when the differential gear moves in the opposite direction by the material becoming slack.

5. The combination with a reel, of a driving motor for the reel, a differential driving gear between the motor and the reel for relieving the strain on the material being reeled when the same becomes taut, a motor control operatively connected with the differential and adapted to slow down the motor when the movement of the differential is caused by the material becoming taut and to speed up the motor when the differential moves in the opposite direction by the material becoming slack, and means for yieldably resisting the movement of the differential gear in either direction from a normal position.

6. The combination with a driving motor of an element driven thereby, opposed gears through which power is transmitted from the motor to the driven element, a differential gear frame rotatably supported between the two gears and having pinions thereon which mesh with the two gears by means of which power is transmitted from one of the gears to the other, an arm on the gear frame, means for yieldably resisting a movement of the arm in either direction to thereby yieldably restrain the frame against rotation, a motor controlling device operatively connected with the arm for actuation upon the movement of the arm, and a stabilizing means connected with the arm.

In testimony whereof I have hereunto set my hand.

LANE JOHNSON.